US009275341B2

(12) United States Patent
Cruse et al.

(10) Patent No.: US 9,275,341 B2
(45) Date of Patent: Mar. 1, 2016

(54) METHOD AND SYSTEM FOR MACHINE COMPREHENSION

(71) Applicant: Cruse Technologies, LLC, Baltimore, MD (US)

(72) Inventors: Bryant G. Cruse, Baltimore, MD (US); Karsten Huneycutt, Durham, NC (US)

(73) Assignee: New Sapience, Inc., Baltimore, MD (US)

( * ) Notice: Subject to any disclaimer, the term of this patent is extended or adjusted under 35 U.S.C. 154(b) by 179 days.

(21) Appl. No.: 13/779,288

(22) Filed: Feb. 27, 2013

(65) Prior Publication Data

US 2013/0226847 A1 Aug. 29, 2013

Related U.S. Application Data

(60) Provisional application No. 61/604,558, filed on Feb. 29, 2012.

(51) Int. Cl.
G06N 99/00 (2010.01)
G06N 5/02 (2006.01)
G06N 5/04 (2006.01)

(52) U.S. Cl.
CPC .............. G06N 99/005 (2013.01); G06N 5/02 (2013.01); G06N 5/04 (2013.01)

(58) Field of Classification Search
CPC ..................................................... G06N 5/00
See application file for complete search history.

(56) References Cited

U.S. PATENT DOCUMENTS

| 7,454,328 | B2 | 11/2008 | Yamaura et al. | |
|---|---|---|---|---|
| 7,984,005 | B2 | 7/2011 | Bridges et al. | |
| 2003/0216919 | A1 | 11/2003 | Roushar | |
| 2007/0219933 | A1 | 9/2007 | Datig | |
| 2009/0254502 | A1* | 10/2009 | Achler | 706/16 |
| 2010/0042401 | A1* | 2/2010 | Ascoli et al. | 704/9 |
| 2010/0088262 | A1* | 4/2010 | Visel et al. | 706/18 |

OTHER PUBLICATIONS

International Search Report/Written Opinion, PCT/US2013/028143, May 9, 2013.
International Preliminary Report on Patentability, PCT/US2013/028143, Feb. 20, 2014.

* cited by examiner

*Primary Examiner* — Alan Chen
(74) *Attorney, Agent, or Firm* — Fitch, Even, Tabin & Flannery LLP

(57) ABSTRACT

The AKOS (Artificial Knowledge Object System) of the invention is a software processing engine that relates incoming information to pre-existing stored knowledge in the form of a world model and, through a process analogous to human learning and comprehension, updates or extends the knowledge contained in the model, based on the content of the new information. Incoming information can come from sensors, computer to computer communication, or natural human language in the form of text messages. The software creates as an output. Intelligent action is defined as an output to the real-world accompanied by an alteration to the internal world model which accurately reflects an expected, specified outcome from the action. These actions may be control signals across any standard electronic computer interface or may be direct communications to a human in natural language.

8 Claims, 10 Drawing Sheets

| REF | LEVEL | CONTEXT | PROPERTY | VALUE |
|---|---|---|---|---|
| 69 | 1 | CONVERSATION | | |
| 70 | | | TYPE | COMMON |
| 71 | | | FORMALITY | CASUAL |
| 72 | | | PARTICIPANTS | AKOS, JOHN |
| 73 | | | CURRENT SPEAKER | JOHN |
| 74 | | | GENERAL TOPIC | TRAVEL |
| 75 | | | CURRENT TOPIC | JOHN'S TRAVEL |
| 76 | 2 | NARRATIVE | | |
| 77 | | | TYPE | HISTORY |
| 78 | | | NARRATOR | JOHN |
| 79 | | | NARRATIVE TIME | |
| 80 | 3 | SENTENCE | | |
| 81 | | | TEXT | |

FIG. 9

| REF | WORD | COMPREHENSION EXPRESSION(S) | INITIAL VARIABLE BINDING | FINAL BINDING |
|---|---|---|---|---|
| 82 | I | Gwm:pronounRefl(?c, ?t) | ?c = CURRENT CONVERSATION<br>?t = ?E = SPEAKER | SAME AS INITIAL |
| 83 | ARRIVED | gwm:sentenceAction(?cs, gwm:TravelSegment(?x)), gwm:location(?s, ?l), gwm:arrivalPoint(?x, ?l) | ?cs = CURENT SENTENCE<br>?x = TRAVEL INSTANCE<br>?s = SUBJECT OF SENTENCE<br>?l = SOME LOCATION | ?s = SPEAKER<br>?l = AMRITSAR |
| 84 | IN | gwm: Location(?pob), gwm:hasLocation(?pob, ?x) | ?pob = OBJECT OF PREP<br>?x = SOME THING | ?pob = AMRITSAR |
| 85 | AMRITSAR | gwm:NamedLocation(?t) | ?t = AMRITSAR | SAME AS INITIAL |
| 86 | AFTER | gwm:TimeCoordinate(?x), gwm:TimeCoordinate(?y), gwm:isGreaterThan(?y, ?x) | ?x = SOME EVENT ?Y = ANOTHER OTHER EVENT | |
| 87 | A | | | |
| 88 | PLEASANT | gwm:hasExperience(?t, gwm:Pleasure) | ?t = SOME SENTIENT | ?t = SPEAKER |
| 89 | TRAIN | gwm:train(?t) | ?t = SOME TRAIN | |
| 90 | RIDE | gwm:ride(?t) | ?t = SOME RIDE | |
| 91 | FROM | | | |
| 92 | DELHI | gwm:NamedLocation(?t) | ?t = DELHI | |

FIG. 10

| REF | TRAVEL SEGMENT PROPERTIES | DOMAIN | RANGE | VARIABLE BINDINGS |
|---|---|---|---|---|
| 93 | gwm:travellersName(?t, ?x) | gwm:Sentient(?t) | gwm:ProperName(?t) | John |
| 94 | gwm:departureTime(?t, ?Tx0) | gwm:Mobiles(?t) | gwm:timeCoordinate(?t) | ?t = Unknown |
| 95 | gwm:arrivalTime(?t, ?Tx1) | gwm:Mobiles(?t) | gwm:timeCoordinate(?t) | ?t = Yesterday Afternoon |
| 96 | gwm:departurePoint(?t, ?x) | gwm:Mobiles(?t) | gwm:Location(?t) | ?t = gwm:Delhi |
| 97 | gwm:arrivalPoint(?t, ?x) | gwm:Mobiles(?t) | gwm:Location(?t) | ?x = gwm:Amritsar |
| 98 | gwm:modeOfTravel(?t, ?x) | gwm:Sentient(?t) | gwm:Locomotion(?t) | ?x = gwm:Ride |
| 99 | gwm:meansOfConveyance(?t, ?x) | gwm:Mobiles(?t) | gwm:Vehicles(?t) | ?x = gwm:Train |
| 100 | gwm:routeOfTravel(?t, ?x) | gwm:Mobiles(?t) | gwm:Routes(?t) | ?x = Unknown |
| 101 | Gwm:travellerExperience(?t, ?x) | gwm:Sentient(?t) | gwm:Experience(?t) | John ?x= gwm:Pleasant |

FIG. 11

METHOD AND SYSTEM FOR MACHINE COMPREHENSION

CROSS REFERENCE TO RELATED APPLICATION

Reference is made to U.S. Provisional Application Ser. No. 61/757,391 entitled Method and System for Machine Comprehension, which application is incorporated herein by reference in its entirety.

BACKGROUND OF THE INVENTION

1. Field of the Invention

The present invention relates to the field of Artificial General Intelligence, more specifically, machine learning and the comprehension of natural human language.

2. Description of the Prior Art

Alan Turing, in his 1950 paper "Computing Machinery and Intelligence," proposed the following question: "Can machines do what we (as thinking entities) can do?" To answer it, he described his now famous test in which a human judge engages in a natural language conversation via teletype with one human and one machine, each of which try to appear human; if the judge cannot reliably tell which is which, then the machine is said to pass the test.

The Turing Test bounds the domain of intelligence without defining what it is. That is useful because people do not know, or at least cannot agree, about what intelligence is; we recognize it by its results. This domain, when seen from the machine perspective, is called Artificial Intelligence. However, over the more than 60 years since Turing's formulation, the term has been loosely applied and is now often used to refer to software that does not by anyone's definition enable machines to "do what we (as thinking entities) can do," but rather merely emulates some perceived component of intelligence such as inference or some structure of the brain such as a neural network. Recently the term "Artificial General Intelligence" (AGI) has come into use to refer precisely to the domain as Turing defined it.

With the exception of the invention disclosed here, it is believed that the current and prior work in AGI has focused on the development of sophisticated information processing algorithms, generally designed to embody a theory of human intelligence or brain function. These approaches see knowledge as a collection of facts created by the algorithms.

Emulation of Human Intelligence

Prior AI researchers have, for the most part, focused on intelligence as an information processing task. This seems to be the obvious approach since humans take in raw sensory data, process it in some way, and produce useful results. That processing step seems to be what is meant by intelligence.

Much software has been written to reproduce or emulate various human mental capabilities, including memory storage and retrieval, logic or inference and pattern matching. Computers now do all of these things very well.

Software "expert systems" using inference engines have produced some very interesting results in restricted domains. Pattern matching, which is the underlying skill required for Master-level chess playing has been implemented in programs demonstrated to be equal or superior to the best human players. Sophisticated data mining algorithms working against mammoth databases, such as IBM's Watson "Jeopardy" playing program, can exceed human performance in general knowledge fact retrieval.

Machine intelligence, however, at least at the level most people would call intelligence has remained elusive and the initial enthusiasm of the 1980's and early 1990s was followed by a period of skepticism sometimes referred to as the "AI Winter". AI skeptics point out that machines do not exhibit any actual comprehension, that is, computers process information but they don't actually understand anything about the world.

Although the software technologies of the last several decades did not converge on anything that would ever have a chance at passing the Turing test, they are still termed AI but with the modifier "narrow" to distinguish them from "real" or general AI".

The current consensus appears to be that AGI will only be achieved by computer emulation of human brain functions and will probably require massive computational resources. Much of the current technical work being pursued focuses on this approach. This perhaps explains why optimism about AGI is growing as it is generally thought that the computational power of computers will soon reach parity with the human brain.

While it may ultimately be possible to create something that produces interesting results by emulating human brain functions on a large scale, it is believed this approach appears to be misguided.

Knowledge-Based Systems

A key difficulty with development of intelligent programs is that intelligence requires knowledge to work but knowledge is also a product of intelligence. Thus endowing computers with the capacity for intelligent action has been a chicken-and-egg problem. There have been a few attempts to create learning systems capable of "bootstrapping" the required world knowledge starting from a "blank slate". In practice this has proven insurmountably difficult.

So called "knowledge-based systems" where the knowledge is contained in explicitly defined rules have shown more promise. These systems have generally treated knowledge as a large unstructured collection of assertions such as "Roses are Red." Such assertions when collected in rule sets provide the basis for "expert systems" which is an AI technique that was much celebrated back in the 1980s but has found few practical applications.

The most significant of these has been undertaken by Cyc Corporation of Austin Tex. and has been underway since 1984 with the goal of creating a system that exhibits what humans would call common sense. This system currently contains about 300,000 elements (like "sky", and "blue") with 3 million assertions ("the sky is blue"). By their own estimates this represents only 2% of what is needed to be comparable with humans. This is certainly not a compact approach.

The Cyc project illustrates the problem with systems that represent knowledge as a simple compilation of assertions. The number of individual elements required to do anything useful quickly becomes unworkable in view of the systems do not scale.

The Sematic Web

More recently, the term "Ontology" has entered the jargon of Artificial Intelligence researchers, particularly in the context of what is called the "Semantic Web." An ontology is a formal definition of a body of knowledge and describes how the concepts that make up that body of knowledge relate to one another. For example, what concept is a subclass of another or what are the attributes of a given member of a class and what are the allowable values for those attributes?

The World Wide Web Consortium has published an xml (markup language) standard for describing Ontologies called the Web Ontology Language which is misspelled OWL for short. OWL has the flexibility to specify arbitrary knowledge precisely. Specifications of this type are an important step forward toward to enabling computers to process information as knowledge.

To date, however, software written to process ontologies expressed in this manner has been very application specific. For example, to make a computer store of medical information searchable in a more powerful way than is possible with a relational database.

It is envisioned that this approach will ultimately result in what is called the Semantic Web. This would be an Internet composed of well-structured ontologies that could permit retrieval of very specific information based on a few simple queries. The software that processes these information stores are called "reasoners" or sometimes, more accurately, "classifiers."

The ability to correctly classify, that is, place a given concept or element of information within a larger well-structured ontology, is a powerful technique. The "reasoners" can identify and classify but they remain programs which run without altering the machines' over-all state with respect to the world around it. They may produce the correct answer to a query but their operation does not produce comprehension in the machine.

Understanding the limitations of the current efforts is illustrated by the fact that domain specific Ontologies are (quite accurately) referred to as knowledge-bases. This is undoubtedly by analogy with databases which contain data organized for quick and accurate data retrieval. Modern knowledge-bases have an ontological structure (as opposed to older ones that were collections of unstructured assertions or rules) but are designed solely for the storage and retrieval of knowledge in response to specific queries.

The intent of the Semantic Web is to replace current web pages designed to be read by humans with machine readable data so that software can perform more of the tedious work involved in finding, combining and acting upon information on the web. It would, were it ever to be realized, make software better at providing humans with information but ultimately it still is about retrieving information for human comprehension. The semantic web has nothing resembling comprehension in itself.

Properly speaking Semantic Web technologies are aimed at the creation of machine readable languages which differ from other computer languages only in that they permit rich meta-data to be applied to text data. Thus, they are not really models of real-world objects but rather semantic models of information optimized for web searches.

Natural Language Interfaces

Currently there are a number of applications with natural language interfaces that are often marketed as "AI." Basically these are text-based interfaces which simply match an explicit text pattern stored in memory with a particular function. Sometimes a variable can be specified in the input pattern and searched against a database for possible alternative responses. "Chatbots", which have found some commercial application, are of this type.

More advanced applications with natural language interfaces use sophisticated search and data mining algorithms against large databases to "guess" a useful result to a particular language input pattern, and are able to eliminate multiple hits depending on the program's current operating context.

IBM's Jeopardy Playing program is of this sort, using the question's category to eliminate otherwise high probability answers. Apple's SIRI uses contextual information such as the user's location or time of day, as well as explicitly entered user preferences, to narrow down the possibilities.

The downfall of these programs is that when they get the right answer they are useful but since they have no idea of what the user is actually talking about. When the algorithms don't return an answer, they are dead in the water, frustrating the user. Also, they don't know that they don't know since they don't know anything. There is a vast difference between knowledge and data. They often return a completely wrong result, frustrating the user even more.

Consider, this actual exchange with SIRI:
Human: What is a cat?
SIRI: I found a number of pet stores near you.

A four year old would easily comprehend the meaning of the statement but SIRI obviously has no idea what the human is talking about.

The current approach for implementing AI leads to a conclusion about machine intelligence. In so far as intelligence is about information processing, computers are today already more intelligent than humans. Computers lack the capacity for intelligent action not because they lack intelligence but because they are totally ignorant about the world.

Thus the question becomes, "can a computer be endowed with knowledge of the world, or in other words, a world model?" The answer is yes with the invention.

Prior computer "models" have been either mathematical models of physical processes like those used in weather prediction or informational models which structure data in a specific databases or knowledge-bases to optimize search and retrieval algorithms or to solve a well-defined and bounded set of problems by the application of logic trees.

SUMMARY OF THE INVENTION

A computer system in accordance with an embodiment of the invention includes at least one data input, the at least one data input for providing a data stream from at least one of a sensor, a data output from another computer, a computer program and a message containing encoded intelligible human language; at least one processor for processing each data stream for creating software objects corresponding to discrete informational elements present in the data stream; a first model comprising an object structure in which objects therein represent real world entities; a context model, dynamically updated by processing of the data stream; and a mapping function which communicates with the at least one processor and the context model and which associates the software objects with corresponding objects within the first model which causes computer code attached to the software objects of the first model to be executed and causes an alteration of the context model and depending on a result of the alteration providing at least one update to the first model including at least one of creation of a new model class representing a class of real world objects, creation of a new model object which represents an instance of a class, creation of a new defined property of the class or an object, and updating a value of a property of a class or an object, the creations providing an extended model. The system further includes a module which communicates with the first model for controlling an action in response to an internal utility function. The at least one output is an action dependent upon a state of the dynamically updated context model.

A computer system in accordance with an embodiment of the invention includes at least one data input, the at least one data input for providing a data stream from at least one of a sensor, a data output from another computer, a computer program and a message containing encoded intelligible human language; at least one processor for processing each data stream for creating software objects corresponding to discrete informational elements present in the data stream; a first model comprising an object structure in which objects therein represent real world entities; a context model, dynamically updated by processing of the data stream; and a mapping function which communicates with the at least one processor and the context model and which associates the software objects with corresponding objects within the first model which causes computer code attached to the software objects of the first model to be executed and causes an alteration of the context model and depending on a result of the alteration providing at least one output which is an action dependent upon a state of the dynamically updated context model. The system further includes a module which communicates with the first model for controlling an action in response to an internal utility function. The at least one output is an action dependent upon a state of the dynamically updated context model.

A method in accordance with an embodiment of the invention in a computer system including at least one data input, the at least one data input for providing a data stream from at least one of a sensor, a data output from another computer, a computer program and a message containing encoded intelligible human language, at least one processor module for processing each data stream for creating software objects corresponding to discrete informational elements present in the data stream, a first model comprising an object structure in which objects therein represent real world entities, a context model dynamically updated by system processing of the data stream and a mapping function which associates the software objects with corresponding objects within the first model which causes computer code attached to the software objects of the first model to be executed and causes an alteration of the context model comprises inputting the data stream to the at least one input; processing each data stream to create the software objects corresponding to discrete informational elements present in the data stream, the mapping function communicating with the at least one processor module; updating the context model by processing the data stream by the system; the mapping function associating the software objects with the objects of the first model and causing an alteration of the context model; and providing at least one output from the system which is an action dependent upon a state of the dynamically updated context model.

At least one code module for execution in a computer system including at least one data input for providing a data stream from at least one of a sensor, a data output from another computer, a computer program and a message containing encoded intelligible human language, at least one processor module for processing each data stream for creating software objects corresponding to discrete informational elements present in the data stream, a first model comprising an object structure in which objects therein represent real world entities, a context model dynamically updated by system processing of the data stream and a mapping function which associates the software objects with corresponding objects within the first model which causes computer code attached to the software objects of the first model to be executed and causes an alteration of the context model, the at least one code module when executed in the computer system performing the steps comprising inputting the data stream to the at least one input; processing each data stream to create the software objects corresponding to discrete informational elements present in the data stream, the mapping function communicating with the at least one processor module; updating the context model by processing the data stream by the system; the mapping function associating the software objects with the objects of the first model and causing an alteration of the context model; and providing at least one output from the system which is an action dependent upon a state of the dynamically updated context model.

The invention embodies such a conceptual world model in software. Only a model with specific characteristics and specifications will enable a machine to comprehend. Such a model, the methodology for its development and the software engine that processes and extends it, are the subject of the invention.

The invention is not based on the collection of facts created by algorithms. Knowledge is believed to consist of a sophisticated information structure that models the external world. If this model is properly designed it can be updated or synchronized with the external world through established information processing algorithms. The process of extending this model is comprehension and it is precisely this, more than any other mental capacity that best describes "what humans as thinking entities do."

The invention, which endows computers with comprehension, is called the Artificial Knowledge Object System (AKOS). The key to Artificial General Intelligence is not "intelligence" in the information processing sense, which already exists in abundance. Instead, it is capacity to process and create "knowledge" in the sense of a rich world model.

The invention embodies a conceptual world model in software. Only a model with specific characteristics and specifications will enable a machine to comprehend. Such a model, the methodology for its development and the software engine that processes and extends it, are the subject of the invention.

Core World Model (CWM)

The enabling technology for the invention is the Core World Model (CWM). It is neither mathematical nor informational and although it does bear a superficial resemblance to some informational models, particularly to those that consist of ontologies that have been developed for the Semantic Web and which are fundamentally different in design and intent.

CWM elements correspond directly to real world objects and model the same things that are the objects of human cognition and are associated with the same symbols (natural language words) that humans use for those objects. The intent is not to support information retrieval to be digested by humans but rather to create a model of the world that can be used to support intelligent actions such as natural language comprehension and practical problem solving by the software itself.

The CWM is a "conceptual" model and not of a specific domain. It is the core body of knowledge needed to comprehend and successfully interact with the everyday world, including the critical conceptual building blocks required to construct (learn) arbitrarily more complex concepts.

Structurally, the CMW is an assemblage of object-oriented software classes corresponding to abstract concepts and software objects corresponding to objective concepts related to each other via variously defined links. Methods, rules, procedures and macros attached to these objects or invoked within a given context traverse these links and determine how the concepts can be extended or combined to form new ones.

One of the most important of these links is the class-subclass relationship which guides the inheritance of properties from class to subclass. A given class may have any specified number of subclasses and any number of parent classes. This permits classes to serve as building blocks for new composite classes.

A key aspect of the CWM is that it is not so much a representation of the real-world as a highly compact specification for representation much like DNA can be a highly compact specification for an organism. This property of compactness has marked advantages over previous attempts to represent knowledge in software such as the Cyc project mentioned above.

AKOS achieves a level of intelligence sufficient for commercial applications with a CWM of only a few thousand model elements. This is possible because the classes which compose the model are specifically chosen to be conceptual building blocks, base classes from which arbitrarily more sophisticated extended worlds model can be created.

Natural human language consists of arbitrary symbols that allow one person to associate a conception in their mind to a similar conception in another mind. Thus, there is a rough numerical correspondence between words and concepts. The English language has almost one million words and a world model that contained one million concepts would hardly be compact. It turns out, however, that judging from how many words are commonly employed in everyday human language a surprising few concepts are commonly required to support intelligent action.

Computational studies of written language reveal that 80% of all printed material consist of the same 2000 words and 72% consist of the same 1000 words. James Ogden published Basic English in 1930. Basic English is a subset of the language consisting of only approximately 850 words which have been demonstrated to be sufficient for routine communication.

The concepts that correspond to these words provide the practical building block concepts upon which an arbitrary number of additional concepts can be constructed. Identification of these concepts is a key characteristic of the invention's methodology, making the development of the model reasonable in scope and the result small enough to be processed by computers of average power.

Humans learn new concepts readily when they can classify the new idea as a subclass of something they already know about (analysis) or a superclass of several existing classes (abstraction). Such classification implies that human knowledge has a hierarchical structure organized by supertype-subtype relationships. The CWM of the invention provides a complete hierarchical framework of concepts such that any new concept can be properly located within the baseline structure after a just few queries.

The class-subclass hierarchy is in the form of an inverted tree as shown in FIG. 2 with the most abstract and general class at the top "Thing" 16 with branches downward to progressively more and more specific classes. A given class can have multiple parents, as Unicorn 18 is both an Organism 22 and a Myth 23. It inherits biological properties from one parent class and epistemological properties from the other.

The inheritance of mythological properties by the Class Unicorn shown in FIG. 2 points to another key attribute of our model which may be termed Epistemological Sophistication. A more complete representation of our model structure than shown in FIG. 2 would show that Unicorn inherits the property of having four feet from the class, Quadruped and that of being warm-blooded from the Class Mammal.

These classes inherit physical properties from the class Physical Objects so it is possible for the model to have an instance of Unicorn of a specified size and weight. However, the Unicorn inherits certain other properties from Myth that have epistemological significance. These properties have attached rules that restrict how the model is updated based on external inputs.

The property list for Otto the Cat 17 indicates that it's Epistemological Status property has the value "real-current" meaning that Otto is an actual cat in the present time. Silva the cat 21 died in 2005 and has the value "real-past." My Little Unicorn 20, is a real toy and has the valve "real-current," and Ki-Lin the Unicorn 19 is "real" and not a toy Unicorn from a story set in the past which has the value "myth-past."

The software can distinguish that My Little Unicorn is a "real" toy but not a "real" unicorn by reference to an "essential parent of class" property which indicates from which parent an object inherits the properties that define its "being." The essential parent of Toy is Artifact while the essential parent of Unicorn is Myth.

Rules bound to epistemological properties prevent modeling interactions that cannot happen in objective reality. For example, no matter how precisely a unicorn may be specified in the model, it cannot interact physically with actual beings. In the same manner the dead cannot interact physically with the living.

Sufficiently complete epistemological properties in the CWM can ultimately permit unambiguous and accurate interpretation of a statement such as: "You can't have a real unicorn because they don't exist but I can get you a toy one." 20

BRIEF DESCRIPTION OF THE DRAWINGS

FIG. 9 is a table of nested context property values.

FIG. 10 is a table of variables for an example sentence of arbitrary form.

FIG. 11 is a table showing the domain, range and variable values for an example template object.

DETAILED DESCRIPTION OF THE PREFERRED EMBODIMENTS

Definitions

REAL-WORLD. The objects of, for humans, thought and cognition, especially things presumed to exist independently of any knowledge of them. These are identical with the CWM.

REAL-WORLD ENTITY. A specific object of thought and cognition that can be represented with a symbol in a data stream.

ABSTRACT CONCEPT. A representation which defines a class or set of real-world objects by enumerating their common properties. An abstract concept may represent a physical object, an action, a relationship or a property of any of these things.

OBJECTIVE CONCEPT. A representation of a specific individual member of a class defined by an abstract concept.

CORE WORLD MODEL. A representation of the real-world having both abstract and objective concepts.

COMPREHENSION. The alteration of the CWM in response to sensory or symbolic input such that world model more accurately reflects the real-world.

INTELLIGENT ACTION. An output to the real-world accompanied by an alteration to the world model which accurately reflects an expected outcome from the action.

THINKING ENTITY. An agent with a powerful capability to alter the real-world through Intelligent Action.

Figure 1:
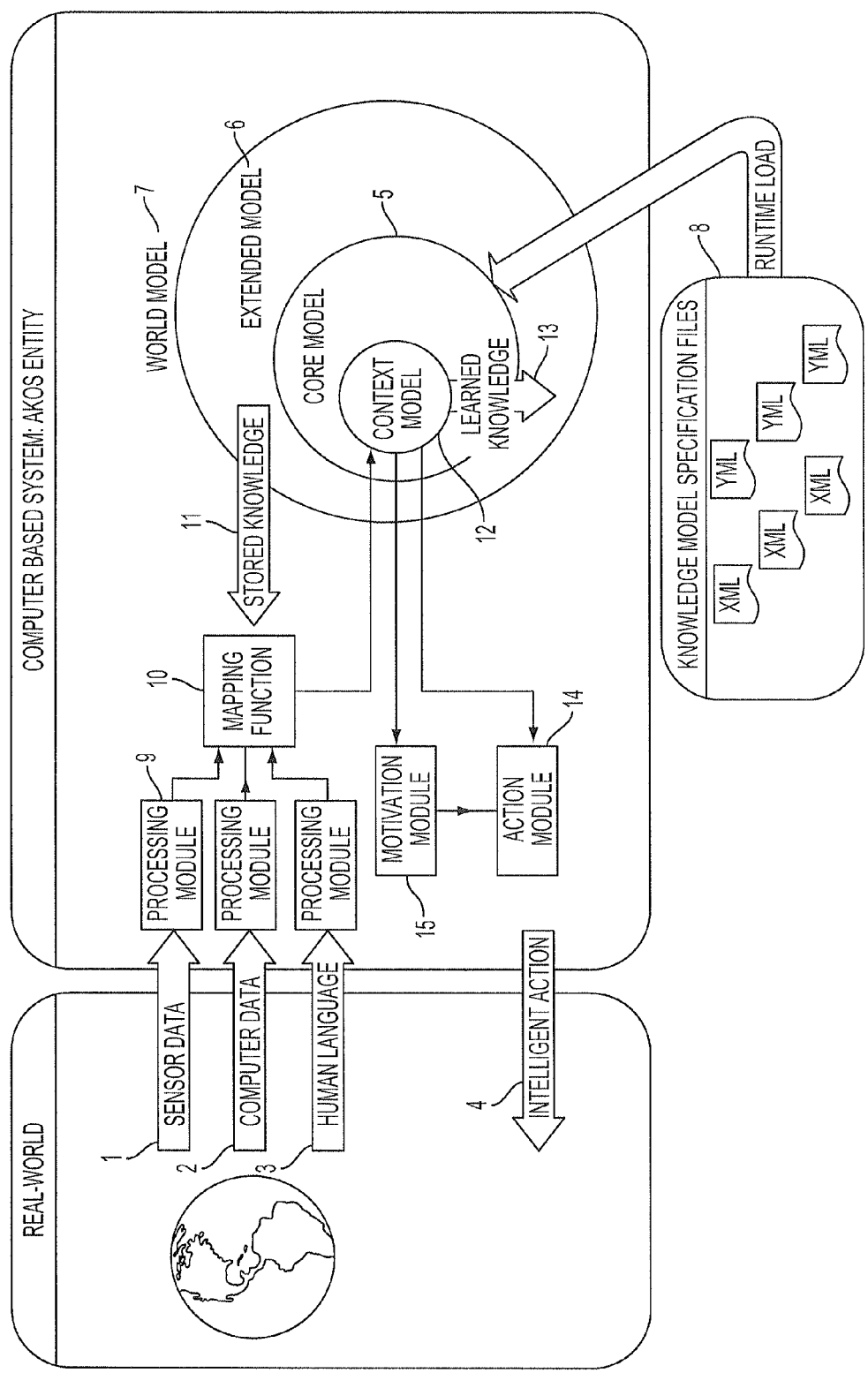
FIG. 1 shows a general functional schematic of the AKOS Entity and its relationship to the external world.
Figure 2:
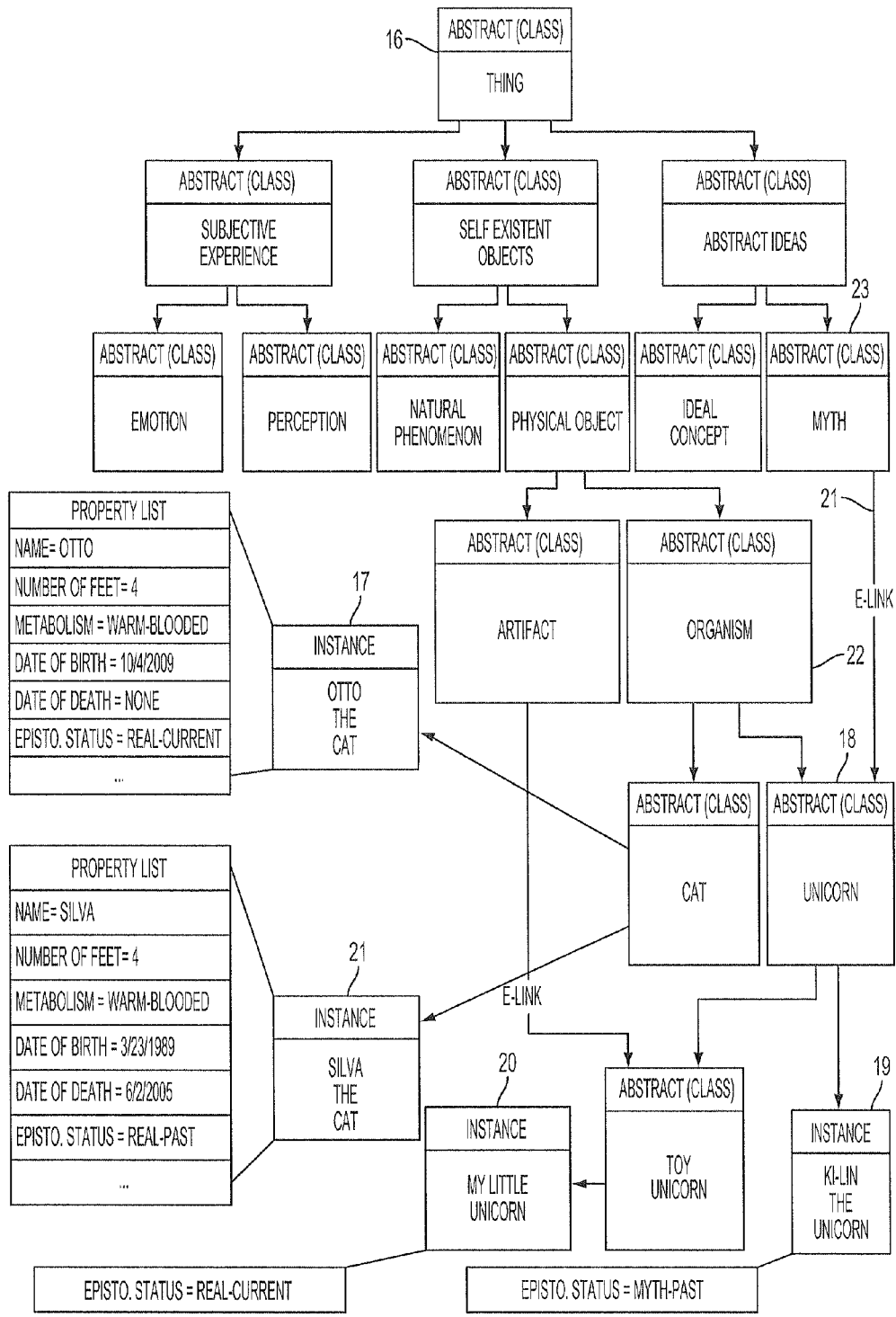
FIG. 2 is a representation of a small portion of the CWM.

FIG. 1 shows the top-level architecture of an AKOS entity and its interaction with the external world. The comprehension process by which incoming information is transformed into learned knowledge 13 is the key that makes the invention a software embodiment of a thinking entity, which is defined as an agent with a capability to alter the real-world through intelligent action.

Comprehension is the same as learning. Most human learning is pedagogic in nature. Most of what is learned about the world is from what is taught by other people through the comprehension of language. Before that can happen, a language must be learned and that in turn depends on a sufficiently complex world model to support a basic vocabulary. Human children must boot-strap their model to gain a few concepts to learn the words for them and then learn a few more concepts. Computers have the advantage of being able to be given a model of arbitrary size and complexity at runtime.

The initial runtime model for the invention is loaded from the Knowledge Model Specification Files 8 shown in FIG. 1. The model specification is essentially the source code for the runtime CWM program and is complied by the AKOS runtime software.

These text files in xml or yml format contain statements in a preferred Knowledge Model Specification Language which may be used in the practice of the invention. These statements define model elements including:
  Abstract Concepts (Classes)
  Objective Concepts (Objects)
  Properties and Property values
  Language patterns
  Flow control constructs including:
  rules
  procedures
  functions
  macros The invention's preferred modeling language solves the chicken-and-egg problem of intelligence versus knowledge. It enables a human to "hand-build" a CWM from the outset. The software engine and its processing algorithms are designed around the CWM and provide capacity to extend and update it.

The methodology that is followed in determining what is required in the CWM is also a part of the invention.

The CWM content is modeled directly on human common knowledge of the world. This is the knowledge, more or less the same as "common sense," that informs everyday lives of people and at the same time provides the building blocks from which more sophisticated knowledge can be constructed. These core common sense concepts are those that most often occur in our thoughts as used in everyday life.

Identification of these concepts is required. Since there is a rough correspondence between natural language words and intellectual concepts, the most commonly used words should point to the commonly used concepts. The CWM building methodology defines model elements that correspond to the roughly 2000 words that comprise 80% of all written texts.

It turns out that while these model elements are necessary, they are not sufficient. They must be fit into an epistemological framework that can delineate ideas about self-existent objects, from ideas about subjective experiences, from ideas about ideas. Epistemological properties describe how the modeled objects relate to the real world. Self-existent objects are things that have physical properties and exit in the current time frame. All other modelled objects are essentially abstractions. These kind of distinctions are of paramount importance in the decision making and problem solving processes required for intelligent action. Additionally, since human language elements are highly contextually dependent, a substantial number of additional model elements to support and define the current context for comprehension are also required.

Many of these supporting model elements, while always understood in the process of human communication, are never themselves subjects of communication and therefore have no name and no corresponding words in human vocabularies.

The invention's method for discovering these elements is to use a modified Turing Test. As named model elements are incorporated corresponding to the word list of roughly 2000 most commonly used words, they are placed in simple test dialogs to determine whether the software can respond to questions as a human would. When it fails to, it is because there is a missing piece of contextual information that must be modeled and incorporated.

Figure 3:
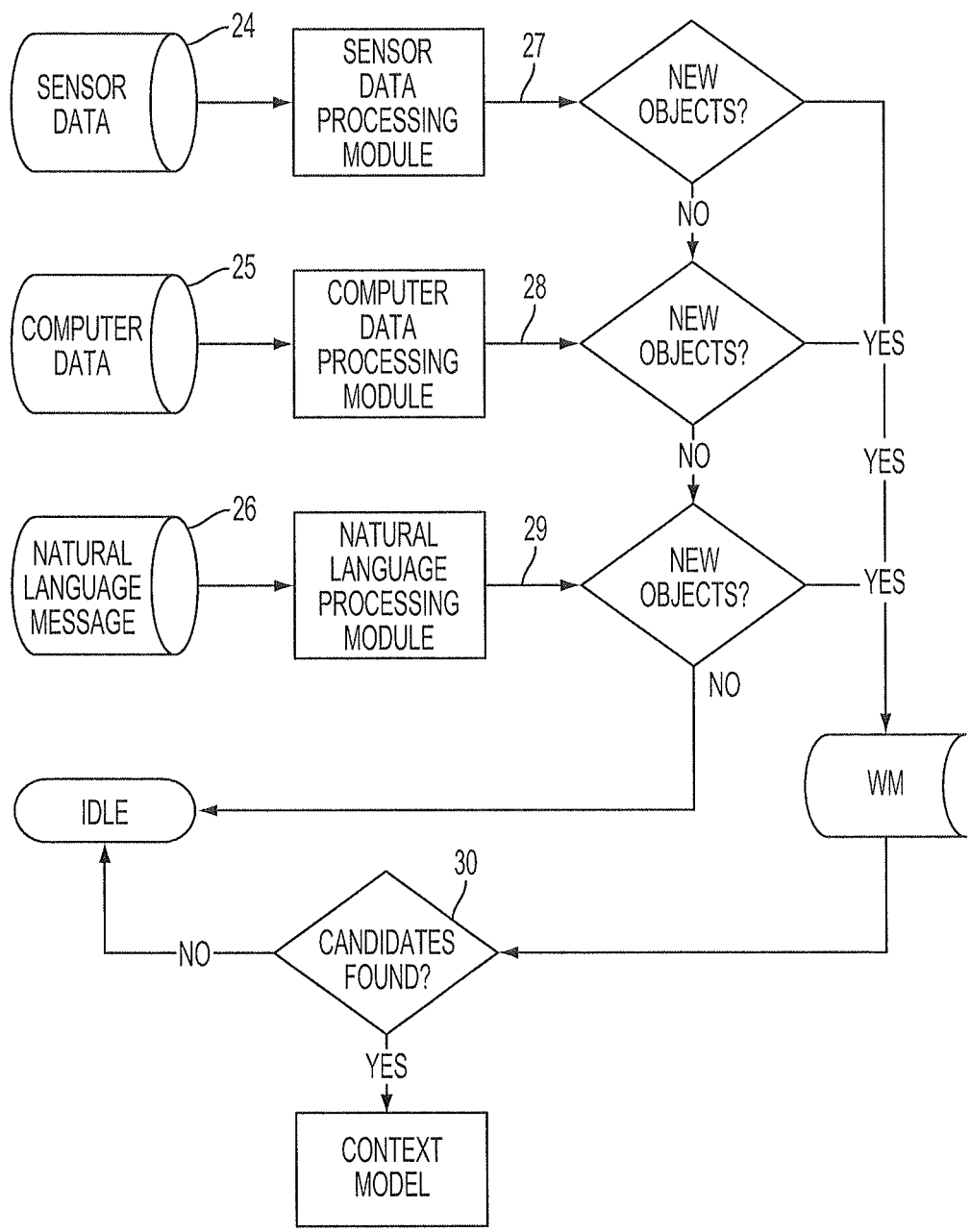
FIG. 3 shows a flow chart of the operation of the Mapping Function.

FIG. 3 shows the Mapping Function which is a driven by data coming into the system on any of a number interfaces to external data. An AKO entity must be configured for at least one such data interface. Three types of data that can be supported including:
  Sensor data 24 obtained from numerical telemetry measuring various physical phenomena as in the case where the AKOS entity is monitoring and/or controlling mechanisms or machinery.
  Computer data 25 obtained from another software program running on the same or another computer or computers.
  Intelligibly formatted messages in a natural human language 26. Intelligibly formatted means that a human can read and understand the message. This is a given as humans are the normal originating source for this type of data.

Figure 7:
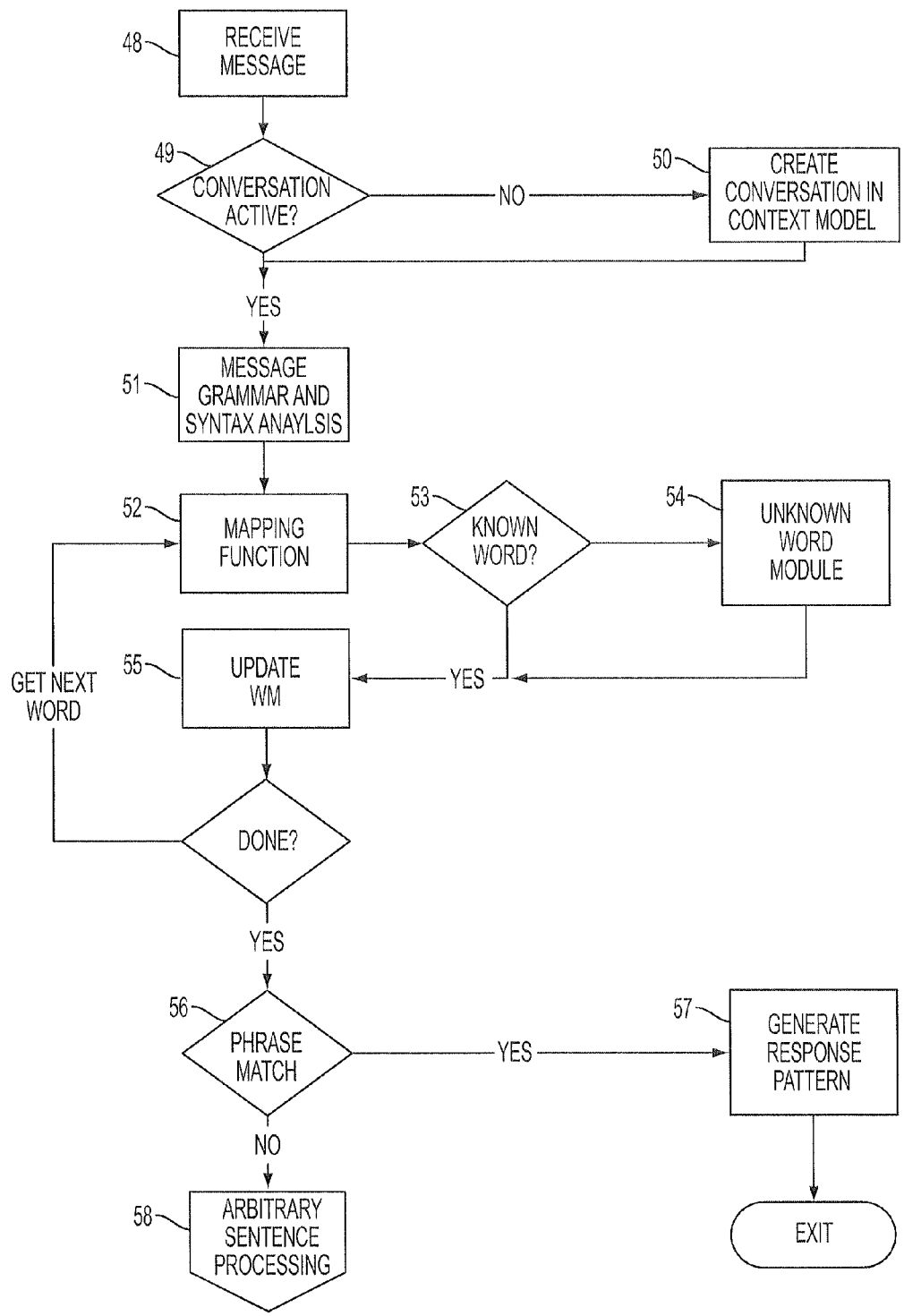
FIG. 7 shows the processing of symbolic messages, specifically the natural language text messages received via the system's messaging interface.

Data processing modules interpret artifacts in the data streams in terms of predefined object types. Information in a sensor data stream is extracted and identified as measurements from specific sensors of specified types 27, and computer data is processed in accordance with a specific API (application programmers interface) 28. Structures within natural language messages include the message or sentence level structure, grammatical phrases, and individual words 29. Processing by the Natural Language Processing Module is shown in FIG. 7.

The mapping function takes the output of the data processing modules and searches the World Model for matches. Matched objects (there may be more than one), are termed "candidates" 30 and include processing instructions that specify how the matched entities in the data streams are to be processed. This processing is performed in the Context Model.

Figure 4:
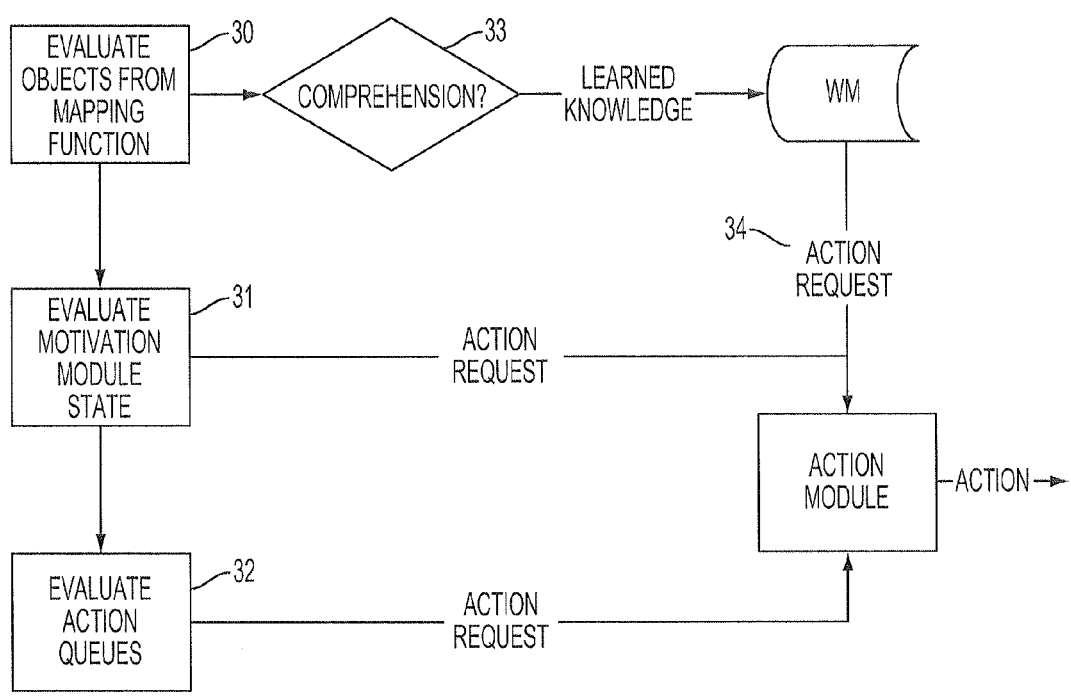
FIG. 4 shows a flow chart of the operation of the Context Model.

FIG. 4 shows processing within the Context Model. The module successively evaluates the state of objects injected into the context by the Mapping Function 30, the state of the Motivation Module 31 and the state of a number of Action Queues 32.

Comprehension 33 takes place when execution of rules or other processing constructs that have been retrieved from the CWM and executed in the Context model result in an update to the extended world model 6. Such updates consist of the creation of a new model class representing a class of real world objects, creation of a new model object which represents an instance of a class, creation of a new defined property of the class or an object, or updating a value of a property of a class or an object.

In some cases, an update to the model can result in direct action request from the CWM to the Action Module 34 without further processing within the Context Model. For example, comprehension that the system has been asked a question can result in a direct answer being returned.

The Context module changes its state dynamically as a result of evaluating inputs from the mapping function and as a result of the operation of the Motivation Module. Depending on how these states match, a request for an action may be outputted to the Action Module or an action request may be placed on one of several Action Queues 32 for deferred execution.

Action Queues include the Time Tagged Queue (executes an action at a specified time), Relative Timed Queue (executes an action at a specified interval after a specified event occurs) or Conditional Queue (executes an action when a when a specified condition becomes true regardless of clock time or elapsed time). It should be noted that these queues are evaluated within the Context Model to ensure that in the current context the assumptions made when the events were placed on the queue previously are still valid and if not, action execution may be terminated or deferred.

Figure 5:
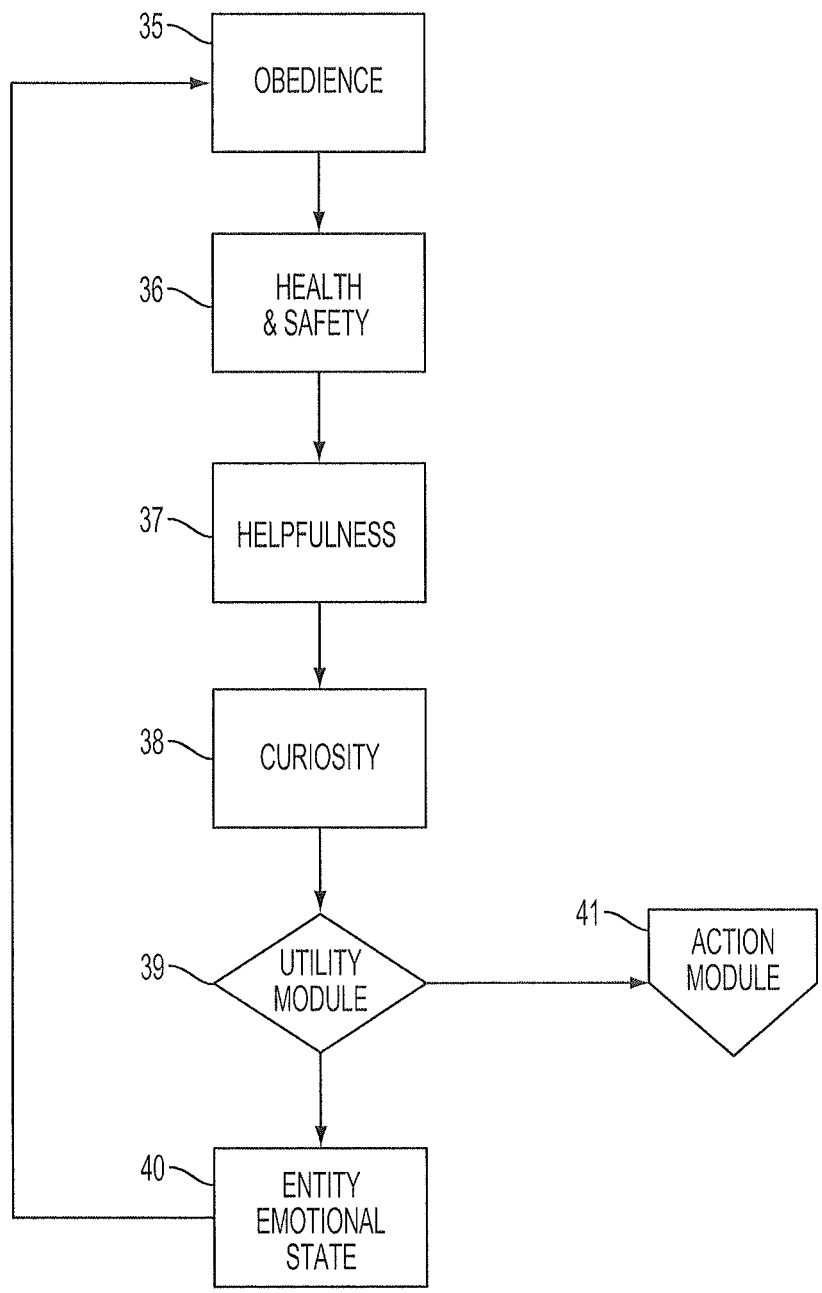
FIG. 5 shows the functional flow of the Motivation Module which controls whether the system will perform an action at any given time.

FIG. 5 shows a flow diagram of the Motivation module which is required to permit the software to initiate an autonomous action. The module runs continuously as a loop on its own processing thread. Modules 35-38 correspond to four separate areas for which actions can be generated. As each module is processed, the values of specific model elements in the CWM for which actions are defined are examined and if not in the desired state a request to perform the associated action is sent to the Action Module 41.

The Obedience module 35 evaluates requests or commands from external sources, evaluates whether there are actions associated with them (e.g., does it know how to perform the request?) and also validates whether in the current context the action can succeed and that the result is allowable.

The Health and Safety module 36 examines data from internal and external sensors to assess whether the software is running properly and determines whether actions are available to improve system operation or to address any threat to continued operation.

The Helpfulness module 37 identifies possible actions known to be of value to humans such as volunteering new information known to be of interest to a specific individual.

The Curiosity module 38 provides motivation for the software to initiate questions to determine the meaning of unknown words or generally to expand the model as the opportunity arises.

Candidate actions identified by modules 35-38 are evaluated by the Utility Module 39 with respect to its built-in utility functions where the final decision is made to execute by sending a request to the action module is made.

The Entity Emotional State 40 is updated based on the success or failure of previous actions. These values are used to calculate an "emotional state" parameter for the software. The value of this parameter is a component of the Context Model.

Figure 6:
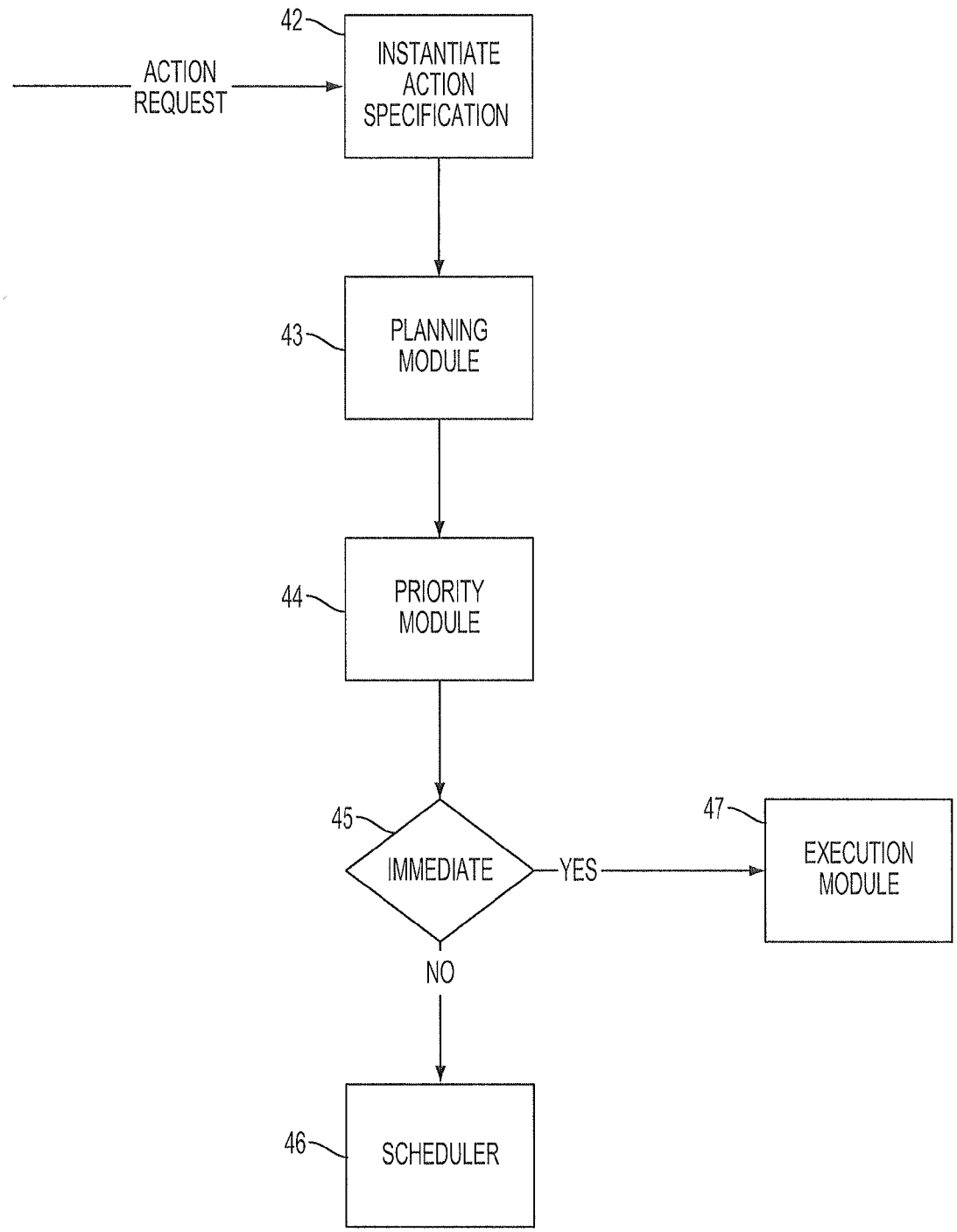
FIG. 6 shows the Action Module which determines how to perform a requested action within the current context as well as planning and scheduling functions.

FIG. 6 shows the operation of the Action Module. The first step 42 upon receipt of an action request is to bind the variables contained in the action specification to the objects in the Context Model or appropriate objects from the CWM. The Planning Module 43 determines how the goal of the action is to be accomplished and it may generate a series of sub-actions. The Priority Module 44 prioritizes the results from the planner with other pending actions stored in the various Action Queues. Immediate actions 45 are sent to the Execution Module 47 and all others are sent to the Scheduler which places them on the appropriate queues for pending execution.

FIG. 7 illustrates message processing which begins with the receipt of a text message 48 on the text interface. The system determines whether a conversation is currently active 49 and creates a new conversation object if it is not. Creation of a current conversation object occurs in the Context Model 50.

The message is then sent to the parser for grammatical analysis 51. The parser determines the phrase structure of the sentence, the part of speech of each word and grammatical usage. AKOS uses a third party parser for this function. Output of the parser is stored in the Context Model and is accessed by rules during the comprehension process.

Each word is then examined by the Mapping Function 53 to determine it is known in the model. If a word is not known, it is sent to the Unknown Word Module 54 for subsequent processing. As words are matched, their comprehension expressions (rules) are executed 52. These rules identify the candidate model elements that map to the word. These are retrieved from the CWM and stored in the Context Model.

The module next checks to see if the form of the message matches a known phrase pattern 56. Phrase Patterns are used for language patterns whose usage has diverged from the normal meanings of their component words as well as short sentences, particularly those containing verbs of being such as "Is a cat a mammal?" Predefined patterns are in the form "Is NP1 a NP2" where NP stands for any noun phrase. When rules associated with the phrase succeed, an NL output is generated in response 57. If the message does not match a predefined phrase, the Arbitrary Sentence Module 58 is called.

Figure 8:
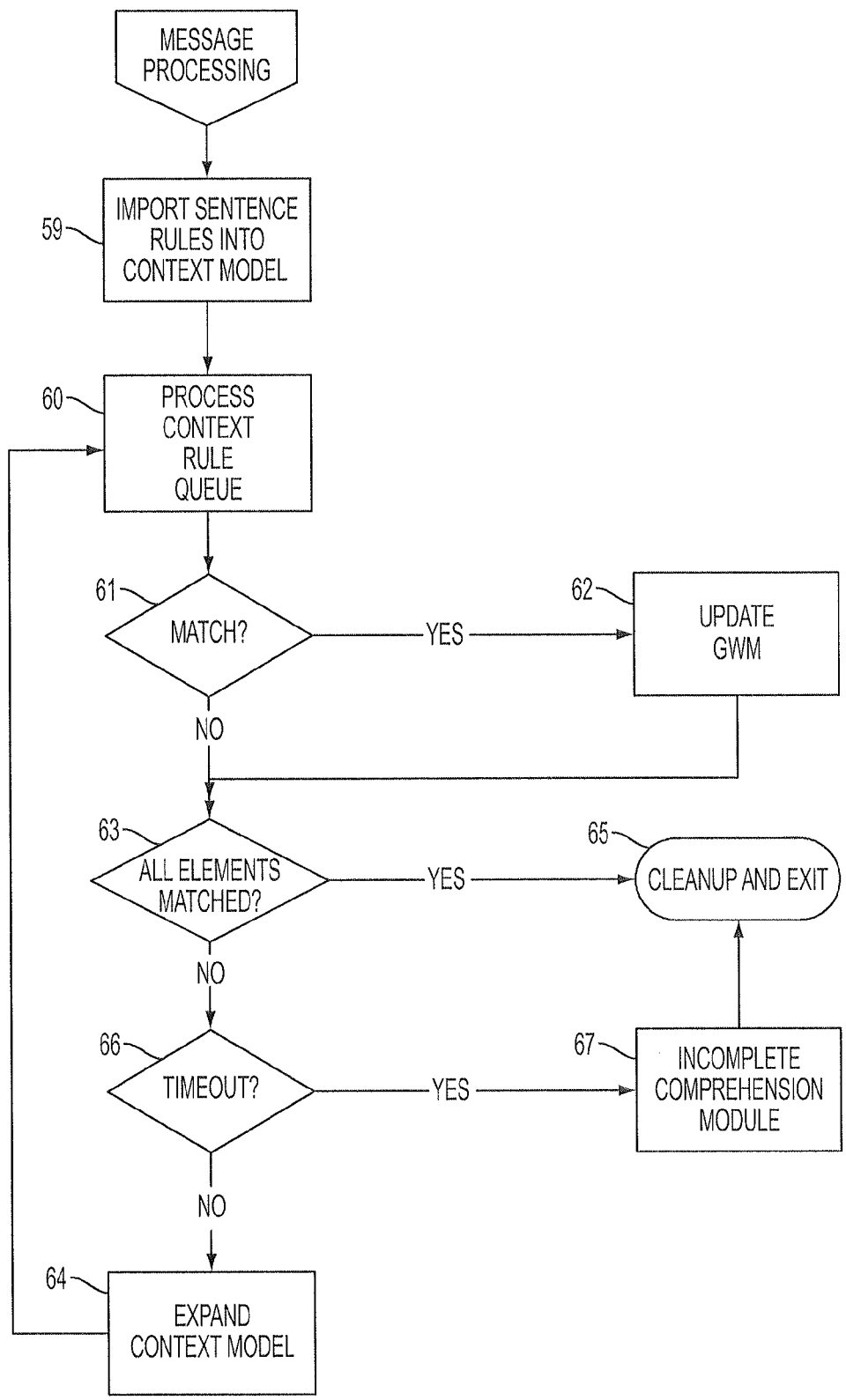
FIG. 8 shows a flow diagram of the processing arbitrary natural language sentences, which are sentences which have valid grammar but that do not match any predefined phrase patterns.

FIG. 8 shows how arbitrary sentences (those which do not map into predefined phrase structures) are processed. It begins by importing the sentence comprehension rules into the Context Model 59. These rules examine the verb, verify its compatibility with the subject and object, and successfully update the model 62 as rules are successively bound to objects in the Context Model. If the model element that a word refers to cannot be matched to anything in the working model, the rules cause additional elements to be imported from the CWM 64. The process of testing the rules and importing additional model elements continues until either, all of the original elements (those identified by the original message processing of the parser output) have been matched by the model updating rules, or a timeout is reached. In the first case, any rules relevant only to the sentence processing are removed from working model rule queue (cleanup) and the module exits 65. If a timeout 66 is reached before all of the model elements have been matched, the unmatched elements are sent to the Incomplete Comprehension Module 67 for subsequent action such as the generation of a clarifying question.

Comprehension of Natural Language Processing Example

This example illustrates how the software can accurately comprehend something new about the external world by processing an English language sentence of arbitrary form.

Language comprehension cannot occur in isolation. It always takes place within a current set of Comprehension Contexts. A Comprehension Context is an AKOS Class with properties whose values are determined dynamically as input is processed. This is accomplished under the control of rules or flow control constructs that comprise the context definition, interacting with those attached to the language objects associated with the input. There are Contexts for conversations, for reading texts, for narrative stories, for jokes and so on.

The set of contexts is recursive, meaning that one is inside the other. For example, during a conversation a person may be telling a narrative story in which another person tells a joke which in turn is composed of sentences.

Language comprehension proceeds by finding mappings between the words in the sentence and model elements in the CWM. All defined words have one or more "comprehension expressions" composed of rules or rule fragments (atoms).

Multiple comprehension expressions resolve the inherent ambiguities of natural language words, specifying the appropriate CWM reference depending on the value of various property values in the current set of comprehension Contexts.

FIG. 9 is a table listing three levels of contexts and some of their properties.

The top level context is Conversation. A conversation context is created automatically whenever a new messaging session is opened. The type property 70 defaults to "common" which indicates an everyday conversation with no preset purpose or agenda. The formality property 71 of a common type conversation defaults to "casual," affecting how AKOS formulates natural language replies.

These property values can be altered during the course of the conversation, for example if the human says, "Let me teach you a new word" the type of Conversation will be changed to "learning."

Some conversational properties may be dependent on the participants. For example, the AKOS entity may have learned that John prefers to speak formally to machines and will therefore always set the formality property to "formal" when talking to John.

The Narrative context 76 is created when a conversation participant begins to tell a story of some kind. Here the type property is set to "history" 77 indicating that the events related are presumed to be actual. The type property could be "hypothetical," "fictional," or "joke" each of which would cause different rule sets to be brought into the Context model controlling how the software comprehends the language input and updates the CWM.

Generally the lowest level context is a complete sentence 80 although smaller expressions, words or sentence fragments may be comprehensible depending on the contexts.

In this example the lowest context is the sentence "I arrived in Amritsar after a pleasant train ride from Delhi."

The sentence emerges from the parser as follows:

(S (NP (PRP I)) (VP (VBD arrived) (PP (IN in) (NP (NNP Amritsar))) (PP (IN after (NP (NP (DT a) (JJ pleasant) (NN train) (NN ride)) (PP (IN from) (NP (NNP Delhi))))))(.))

The tags are called Treebank Tags and identify the part of speech of each word as well as identifying the type of phrase it is in. For example in the above parse JJ indicates an adjective, NN a noun and NP a noun phrase.

The parser also identifies grammatical dependency relationships between the individual words in the sentence. Both the Treebank tags and dependency annotations can be accessed by from the rules and rule atoms.

The comprehension expressions for each word together with their initial and final variable bindings are shown in FIG. 10.

A brief discussion of the AKOS comprehension expression rules language is necessary to support the example.

There are three types of components to any comprehension expression atom:
  variables: variables always begin with ?, which must be followed by a letter, and then any number of letters or digits
  explicit model instances: all explicit model elements are of the form namespace:localName. After a namespace: sequence, a localName indicates the local name under discussion.
  literals: all literals must be enclosed in double quotation marks A variable can either be bound, fixed, and set externally to the rule (in the case of ?c for the current context or ?e for the current speaker), or it can be unbound and will be determined over the course of rule evaluation. Over the course of antecedent evaluation, the rules engine builds up solutions, which are groups of values of variables. These solutions are filtered and expanded over the course of the rule evaluation. At the end of antecedent evaluation, if any solutions remain, the rule is matched.

There are four types of atoms:
  class atom: class(one), where argument one can be only a variable. example: gwm:Cat(?x)
  property atom: property(one, two), where one can be either an instance or a variable, and two can be an instance, a variable, or a literal. Example: gwm:hasOwner(?x, "me"), gwm:hasOwner(gwm:self, gwm:You), gwm:hasOwner(?x, ?y).
  built-in atom: these perform specified actions such the creation of a new class or property
  assignment atom: variable=property(one), where the left hand side MUST be a variable, and argument one can be an instance or a variable.

Assignment atoms may only appear in the consequent of a rule.

Comprehension expression rules are bound to word objects, phrase objects and may also be invoked via flow control constructs such as macro calls, function calls and procedure calls. Generally nouns are bound to simple Class atoms, adjectives and adverbs to Property atoms while verbs have more complex expressions.

When words are bound to model elements those elements may have processing instructions (rules and/or flow control constructs) which become active in the current set of comprehension contexts. Thus the working model in which comprehension processing takes place is comprised of instructions from the language element comprehension expression, instructions from the matched model elements, and instructions from the context set.

As variables are bound and all of the atoms on the left-hand (antecedent) side of a rule become true, the right hand (consequent) side of the rule will be executed causing in turn more variables in the processing space to be determined causing additional rules to succeed and so on. Built-in functions, and flow control constructs can also be executed from the rule consequents, further altering the working model.

In FIG. 10 the word "I" has the comprehension expression gwm:pronounRefl(?c, ?t). ?c is predefined variable bound to the current conversation object. ?t is bound to the object representing the current speaker.

In arbitrary sentence processing the aim is to comprehend the completed action of the verb. Here the verb "arrived" has the expression:
gwm:TravelSegement(?x), gwm:sentenceAction(?cs, ?x), gwm:location(?s, ?l), gwm:arrivalPoint(?t, ?l)

The sense of this comprehension expression is that at the completion of the sentence action, the subject of the sentence has changed position to a new location ?cs is the built-in variable for the current sentence and ?s is for the subject of the sentence which has been bound to the current speaker.

So the expression becomes:
gwm:sentenceAction(?cs, gwm:TravelSegement(?t)), gwm:location(John, ?l), gwm:arrivalPoint(?x, ?l) where John's location is the same as the location of the travel segment represented by the variable ?l.

The sentence processing module creates an instance of the gwm:sentenceAction value which in this case is gwm:TravelSegment(?t). This instance is based on the Template Instance for the class gwm:TravelSegment.

Template Instances are fundamental in the process of creating a new instance of any given class and are defined for major classes that represent real-world objects. They define the most significant properties along with the statistical variation of those properties and their default values if any.

Template Instances can be simple or highly detailed like the template for Human which amounts to a major sub-model in the CWM.

The instance of travel segment created from the class template instance (shown in FIG. 10) provides the key to comprehending the other words in the sentence. When a template instance is created, its variables are matched to elements in the current context set. Filtering of possible matches is aided by reference to the Domain and Range of the individual properties present in the working model. The Domain of a property defines the classes that the property can be predicated of while the Range specifies the possible values the property may have.

For example, gwm:arrivalPoint(?t, ?x) 97 and gwm:departurePoint(?t, ?x) 96 have the Domain gwm:Mobiles(?x) which all thing that can move are subclasses of and the Range of gwm:Location(?x). Thus Delhi 92 and Amritsar 85 as instances of gwm:NamedLocation(t), a subclass of gwm:Location(?t) are the only model elements that can be matched to these properties of the temple instance.

Finally, grammatical clues are analyzed to further narrow down possible matches. Amritsar is bound to gwm:arrivalPoint(?t, ?x) by virtue of being the grammatical object of the preposition "in" 84 while Delhi is bound to gwm:departurePoint(?t, ?x) because it is the object of the preposition "from 91."

The atoms gwm:location(?s, ?l), gwm:arrivalPoint(?x, ?l) bind the location of the subject to the same location as the arrival point value of the travel segment instance.

At this point the main action of the sentence has been comprehended and within the narrative context we have at the completion of the sentence action: gwm:location(John, Amritsar).

After the verb has been comprehended, the other words are processed in the same fashion resulting in the variable bindings shown in FIG. 11. The model for John within the narrative context has been updated. AKOS knows that John traveled from Delhi to Amritsar via train and found it pleasant.

This knowledge about John is retained permanently. The travel segment instance is retained during the course of the conversation and is used to help comprehend subsequent language input. It's properties will continue to be updated as more information is obtained, for example at this point the route of travel is still unspecified as is the departure time.

The value of properties that are brought into the working model can sometimes also be obtained by reference to attached methods rather than simply the result of language comprehension. While the ability to comprehend natural language is unprecedented for a software processing engine the program still retains all the power of computing in general.

For example, if an AKOS entity is being used to help plan someone's air travel, the system could instantiate an air travel template instance from the model and after asking the traveler a few questions, could populate the rest of the instance properties by accessing an online database.

Answering a Common Sense Question Example

A common and quite reasonable claim of AI skeptics is that machines lack common sense. Consider the question, "Which are larger cats or dogs?" While it could be argued the question is too unspecified to be fair for a computer, even a human child will answer it without hesitation and provide the answer expected by the questioner: "a dog." The really is that such everyday questions are fully specified, the precise specifications are provided by the context in which it is asked.

This question would be asked in a general everyday conversational context which is exactly the sense of the AKOS Conversation context with the type property value of "common" as in the previous example 70.

One of the properties of most nouns in the CWM that support this is gwm:commonClass(?t, ?x). This property points to another class which narrows the scope of the noun to those instances of the general class relevant to everyday usage. For cats and dogs the value of this property is gwm:Pets(?t) since we rarely encounter wild ones.

Simple queries containing verbs of being like this are handled with pattern recognition rather than with arbitrary sentence processing. This query matches the pattern:
"Which are larger NP1 or NP2?"

The pattern evokes a procedure which compares the height of the statistically average instances of the two classes as defined in their template instances.

If the conversation type is "common", the variables NP1 and NP2 are bound to the template instances for gwm:PetCat(?) and gwm:PetDog(?t). If the conversation context was "scientific", the templates for gwm:Felis(?t) or gwm:Canis(?t) would be invoked and the answer might be different.

It should be noted that this method produces accurate information about the world based on modeling specific contextual information. Humans are often not aware of the context information they causally employ in everyday speech. What is more, whether humans are aware of the context discriminators or not many times their "templates" are sometimes based on their own common experience (which is occasionally erroneous) rather than on the precisely defined statistics which AKOS, lacking direct experience of the world, bases its answers on.

Example Learning Through Conversational Dialog

The following is an actual transcript of an AKOS entity named Helen learning about a new animal.
Teacher: What is a hamster?
Helen: I don't know.
(The program searches the model and finds no referent for the word hamster.)
Teacher: A hamster is a rodent.
Helen: OK, a hamster is a rodent
(The program finds no referent for rodent either.)
Helen. Can you tell me more about rodents?
Teacher: A rodent is a mammal.
Helen: OK (The program has a referent for mammal and some knowledge about how to distinguish subclasses.)
Helen: Are hamsters usually wild animals or more often domesticated?
Teacher: Hamsters are commonly pets.
Helen: I understand, usually but not always.
Helen: What size are hamsters compared to other rodents?
Teacher: They are average.
Helen: I see
Helen: Are rodents usually wild animals or more often domesticated?
Teacher: Rodents are commonly wild.
Helen: I understand, usually but not always.
Helen: What size are rodents compared to other mammals?
Teacher: They are small.
(At this point the program has created rodents as a subclass of mammal and hamster as a subclass of rodent and established some basic discriminators, namely diet and relative size.)
Teacher: What is a hamster?
Helen: A hamster is a type of rodent.
Teacher: What else do you know about hamsters?
Helen: They are small rodents, commonly they are pets.

In summary, the present invention is a method by which a computer program is built that, as Turing described it, "does what humans as thinking entities do." This is not an ability to perceive the world through senses; other animals do that as well or better. It is not the mental acuity to solve mathematical puzzles or games. The best chess player in the world is a computer. It is comprehension, a capability which in turn is the key to learning in the pedagogic sense. That is, that the system has the capacity to ask questions like a human would and give answers like a human would. This pedagogic learning is the way humans acquire by far the greater part of the knowledge of the world that makes them effective agents. Such a capability when combined with the precision, memory and networking characteristics of computers is of immense practical and commercial value.

What is claimed is:

1. A computer system, comprising:
at least one data input, the at least one data input for providing a data stream from at least one of a sensor, a data output from another computer, a computer program and a message containing encoded intelligible human language; at least one processor for processing each data stream for creating software objects corresponding to discrete informational elements present in the data stream;
a first model comprising an object structure in which objects therein represent real world entities;
a context model, dynamically updated by processing of the data stream;
and a mapping function which communicates with the at least one processor and the context model and which associates the software objects with corresponding objects within the first model which causes computer code attached to the software objects of the first model to be executed and causes an alteration of the context model and depending on a result of the alteration providing at least one update to the first model including at least one of creation of a new model class representing a class of real world objects, creation of a new model object which represents an instance of a class, creation of a new defined property of the class or an object, and updating a value of a property of a class or an object, the creations providing an extended model.

2. A computer system in accordance with claim 1 comprising:
a module which communicates with the first model for controlling an action in response to an internal utility function.

3. A computer system in claim 1 wherein the at least one output is an action dependent upon a state of the dynamically updated context model.

4. A computer system in claim 2 wherein the at least one output is an action dependent upon a state of the dynamically updated context model.

5. A computer system, comprising:
at least one data input, the at least one data input for providing a data stream from at least one of a sensor, a data output from another computer, a computer program and a message containing encoded intelligible human language;
at least one processor for processing each data stream for creating software objects corresponding to discrete informational elements present in the data stream;
a first model comprising an object structure in which objects therein represent real world entities;
a context model, dynamically updated by processing of the data stream;
and a mapping function which communicates with the at least one processor and the context model and which associates the software objects with corresponding objects within the first model which causes computer code attached to the software objects of the first model to be executed and causes an alteration of the context model and depending on a result of the alteration providing at least one output which is an action dependent upon a state of the dynamically updated context model.

6. A computer system in accordance with claim 5 comprising:
a module which communicates with the first model for controlling an action in response to an internal utility function.

7. A method of providing an output in a computer system, the computer system including at least one data input, the at least one data input for providing a data stream from at least one of a sensor, a data output from another computer, a computer program and a message containing encoded intelligible human language, at least one processor module for processing each data stream for creating software objects corresponding to discrete informational elements present in the data stream, a first model comprising an object structure in which objects therein represent real world entities, a context model dynamically updated by system processing of the data stream and a mapping function which associates the software objects with corresponding objects within the first model which causes computer code attached to the software objects of the first model to be executed and causes an alteration of the context model, the method comprising:
inputting the data stream to the at least one input;
processing each data stream to create the software objects corresponding to discrete informational elements present in the data stream, the mapping function communicating with the at least one processor module;
updating the context model by processing the data stream by the system;
the mapping function associating the software objects with the objects of the first model and causing an alteration of the context model; and
providing at least one output from the system which is an action dependent upon a state of the dynamically updated context model.

8. A non-transitory computer readable storage medium storing at least one code module for execution in a computer system, the computer system including at least one data input, the at least one data input for providing a data stream from at least one of a sensor, a data output from another computer, a computer program and a message containing encoded intelligible human language, at least one processor module for processing each data stream for creating software objects corresponding to discrete informational elements present in the data stream, a first model comprising an object structure in which objects therein represent real world entities, a context model dynamically updated by system processing of the data stream and a mapping function which associates the software objects with corresponding objects within the first model which causes computer code attached to the software objects of the first model to be executed and causes an alteration of the context model, the at least one code module when executed in the system, performing the steps comprising:

inputting the data stream to the at least one input;

processing each data stream to create the software objects corresponding to discrete informational elements present in the data stream, the mapping function communicating with the at least one processor module;

updating the context model by processing the data stream by the system;

the mapping function associating the software objects with the objects of the first model and causing an alteration of the context model; and providing at least one output from the system which is an action dependent upon a state of the dynamically updated context model.

* * * * *